United States Patent
Shields et al.

[11] Patent Number: 6,107,569
[45] Date of Patent: Aug. 22, 2000

[54] FOAM WIRE HARNESS IN A PILLAR

[76] Inventors: Scott D. Shields, 8090 High Point Trail, White Lake, Mich. 48386; Jeffrey A. Branch, 15631 Juliana, Eastpointe, Mich. 48021

[21] Appl. No.: 09/076,180

[22] Filed: May 12, 1998

[51] Int. Cl.$^7$ .................. H02G 3/00; H02G 3/04
[52] U.S. Cl. .......... 174/72 A; 174/71 R; 174/72 C; 174/110 F
[58] Field of Search .............. 174/72 A, 71 R, 174/72 C, 69, 135, 72 TR, 110 F

[56] References Cited

U.S. PATENT DOCUMENTS

| | | | |
|---|---|---|---|
| 3,946,768 | 3/1976 | Fiorentino | 140/92.1 |
| 3,985,951 | 10/1976 | Harris | 174/138 F |
| 4,119,794 | 10/1978 | Matsuki | 174/68 R |
| 4,270,961 | 6/1981 | Faranetta et al. | 156/51 |
| 4,444,705 | 4/1984 | Kumasaka et al. | 264/46.5 |
| 4,653,155 | 3/1987 | Hara | 24/16 PB |
| 4,848,829 | 7/1989 | Kidd | 296/152 |
| 4,923,537 | 5/1990 | Matsushima | 156/48 |
| 5,030,116 | 7/1991 | Sakai et al. | 439/130 |
| 5,082,253 | 1/1992 | Suzuki et al. | 269/45 |
| 5,168,124 | 12/1992 | Takase et al. | 174/23 R |
| 5,230,146 | 7/1993 | Tsuji et al. | 29/861 |
| 5,338,014 | 8/1994 | Kitamura | 269/47 |
| 5,355,787 | 10/1994 | Burns et al. | 100/27 |
| 5,365,416 | 11/1994 | Peterson | 362/135 |
| 5,490,664 | 2/1996 | Justus et al. | 269/66 |
| 5,500,179 | 3/1996 | Onishi et al. | 264/400 |
| 5,535,511 | 7/1996 | Karasik | 29/872 |
| 5,575,500 | 11/1996 | Mimura et al. | 280/751 |
| 5,598,627 | 2/1997 | Saka et al. | 29/861 |
| 5,777,270 | 7/1998 | West et al. | 174/99 B |

FOREIGN PATENT DOCUMENTS 0235924  9/1987  European Pat. Off.

*Primary Examiner*—Kristine Kincaid
*Assistant Examiner*—Mark E. Olds
*Attorney, Agent, or Firm*—MacMillan, Sobanski & Todd, LLC

[57] ABSTRACT

A wire harness includes a plurality of wires encased in a continuous foam sheath. The sheath is mounted adjacent a first surface of a vehicle pillar. A trim panel secured to the pillar encloses the wire harness. Connectors on the trim panel pass through apertures through the sheath and snap-fit into apertures in the pillar.

11 Claims, 1 Drawing Sheet

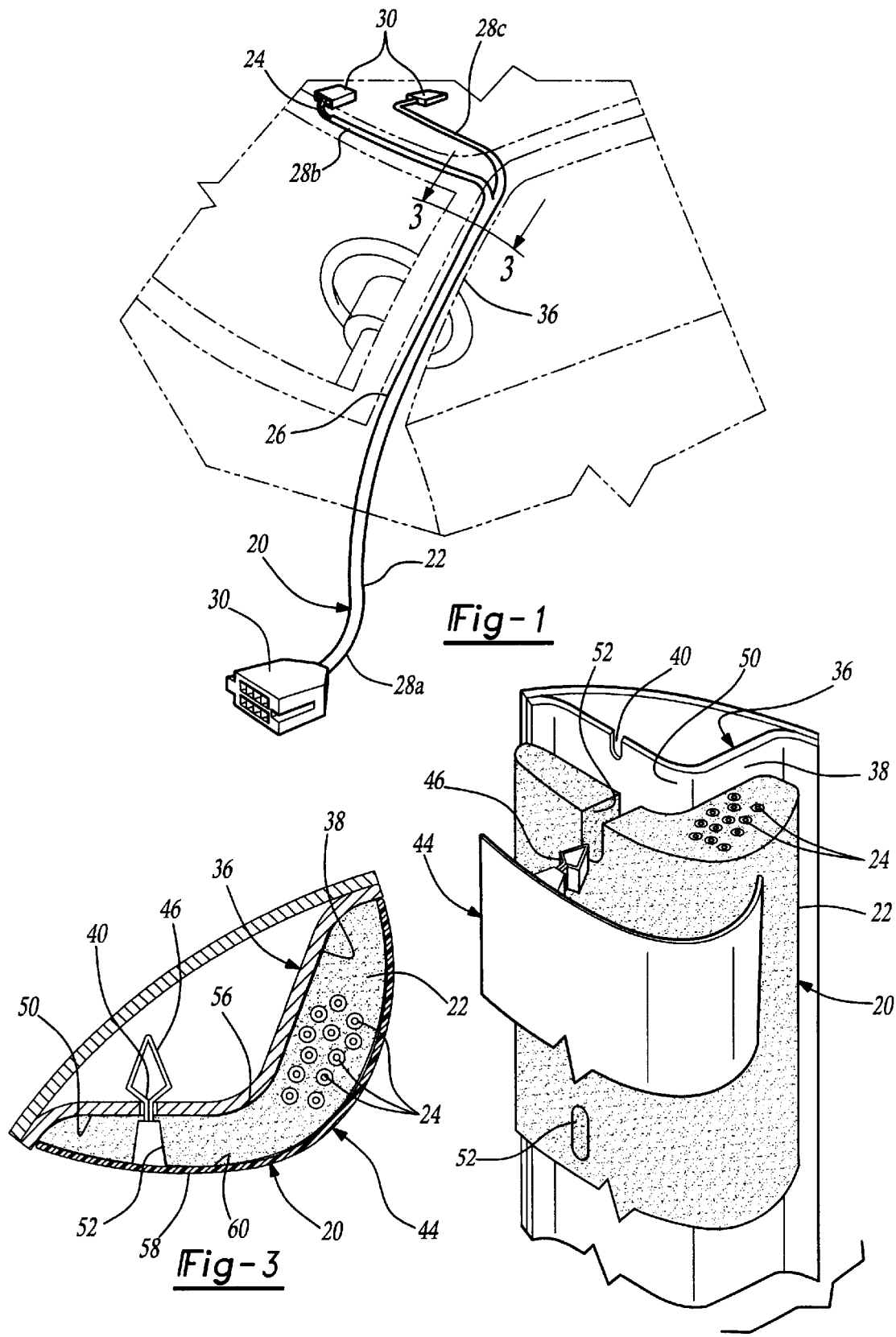

FOAM WIRE HARNESS IN A PILLAR

BACKGROUND OF THE INVENTION

The present invention relates generally to wire harnesses and more particularly to a wire harness having a foam sheath, particularly for use in a pillar on a vehicle.

Current vehicles include numerous wire harnesses interconnecting an increasing number of electrical components to user-activated and computer-controlled switches and sensors. Each wire harness comprises a plurality of wires which are bundled to form a main trunk and a plurality of branches extending from the trunk. Typically, each of the branches includes an electrical connector at an outer end. The wires are wrapped with tape along the entire length of the main trunk and each of the branches.

Many wires in a vehicle are routed through one of the pillars to provide power and control signals to devices mounted in the headliner or the rearview mirror. For example, many vehicles include a message center mounted in the headliner which provides information regarding the operation of the vehicle, temperature, heading, etc. Sunroofs in vehicles must be supplied with electrical power. Some vehicles include speakers mounted in or wired via the headliner. Many vehicles include rearview mirrors which require power, such as for automatic dimming or an electronic display. All of these devices, as well as others, require power and/or control signals supplied via a wire harness routed through one of the vehicle pillars.

Generally, the wire harness is secured to the pillar with numerous clips. Then a trim panel is secured to the pillar, enclosing the wire harness. The trim panel includes a plurality of clips which snap fit into the pillar. If the wire harness is not positioned properly on the pillar, the clips on the trim panel may cut or damage the wire harness and wires.

United Technologies Automotive has developed a new wire harness in which the wires are encased in molded foam sheath. This is described in more detail in co-pending applications U.S. Ser. No. 08/898,663, filed on Jul. 22, 1997 entitled "FOAMED-IN WIRE HARNESSES." Improvements are more fully disclosed in other co-pending applications: "WIRE HARNESS WITH INTEGRAL CONNECTOR" U.S. Ser. No. 08/920,768; "APPARATUS FOR CENTERING WIRE HARNESS IN MOLD" U.S. Ser. No. 08/920,458; "WIRE HARNESS WITH SPLICE LOCATORS" U.S. Ser. No. 08/920,589, now U.S. Pat. No. 5,973,265 issued Oct. 26, 1999; "METHOD AND APPARATUS FOR SECURING WIRE HARNESS TO SURFACE" U.S. Ser. No. 08/920,978, now U.S. Pat. No. 6,027,679 issued Feb. 22, 2000; "MULTISHOT MOLDS FOR MANUFACTURING WIRE HARNESS" U.S. Ser. No. 08/920,857, now U.S. Pat. No. 5,917,151 issued Jun. 29, 1999; "MOLDS FOR ASSEMBLING & FORMING WIRE HARNESS" U.S. Ser. No. 08/919,946; "FOAM WIRE HARNESS WITH SHAPE MEMORY" U.S. Ser. No. 08/920,570, all filed on Aug. 29, 1997; "WIRE HARNESS FOAMED TO TRIM PANEL" U.S. Ser. No. 08/927,748 filed on Sep. 11, 1997; and "WIRE HARNESS FOR VEHICLE SEAT" U.S. Ser. No. 09/061,404, now U.S. Pat. No. 6,011,318 issued Jan. 4, 2000. filed concurrently with the present application.

SUMMARY OF THE INVENTION

The present invention provides a wire harness in a vehicle pillar which increases the protection of the wires, reduces the potential for noise in the pillar, reduces the likelihood of damage during assembly and improves head impact performance of the pillar.

The wire harness includes a plurality of wires encased in a continuous foam sheath. The wire harness is routed adjacent a first surface of a vehicle pillar. A trim panel is secured to the pillar over the wire harness.

Preferably, the sheath substantially fills the cavity defined between the first surface of the vehicle pillar and the trim panel. Further, the sheath preferably has a first contour which is generally complementary to a contour of the first surface of the vehicle pillar. The sheath preferably also includes a second contour which is generally complementary to a contour of the trim panel.

Preferably, a plurality of apertures are molded through the sheath. One or more connectors pass through the sheath to connect the trim panel to the vehicle pillar. Preferably, snap fit tabs on the trim panel pass through the apertures through the sheath and snap into apertures on the vehicle pillar. The apertures through the sheath properly position the sheath on the vehicle pillar to prevent damage to the sheath by the trim panel connectors.

The wire harness of the present invention requires fewer connectors to the vehicle pillar, while increasing the protection of the wires and reducing the likelihood of damage to the wires during connection of the trim panel to the vehicle pillar. The foam sheath may provide a cushioned surface which would potentially reduce head injury in the event of a passengers head striking the vehicle pillar in a crash.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 illustrates the wire harness of the present invention routed through a vehicle pillar;

FIG. 2 is an exploded view, partially broken away, of the wire harness of FIG. 1 passing through the vehicle pillar;

FIG. 3 is a sectional view taken along line 3—3 of FIG. 1.

DETAILED DESCRIPTION OF A PREFERRED EMBODIMENT

A wire harness 20 according to the present invention is generally shown in FIG. 1 comprising a continuous, molded, polymer sheath 22, preferably comprising a polymer foam, and most preferably Elastoflex®, available from BASF. The sheath 22 encases a plurality of wires 24 which are routed to form a main trunk 26 continuous with a plurality of branches 28a–c, each of which terminate in an electrical connector 30, each electrically connected to at least some of the wires 24.

The wire harness 20 is routed through a pillar 36 in a vehicle, such as the A-pillar, as shown. The wire harness 20 may also be routed through any of the pillars in the vehicle. The wire harness 20 provides power and control signals to electronic devices located in the headliner, the roof or the rearview mirror, such as electronic message center, sunroof, dimmable rearview mirror, interior lighting, speakers, etc.

FIG. 2 is an exploded view, partially broken away, generally from the interior of the vehicle of FIG. 1. The pillar 36 has a contoured first surface 38 facing toward the interior of the vehicle and having a plurality of apertures 40 (one shown). A trim panel 44 for securing to the pillar 36 and for providing an aesthetically pleasing interior appearance includes a plurality of snap-fit connectors 46, which are complementary to the apertures 40 in the pillar 36. An elongated cavity 50 is defined between the trim panel 44 and the pillar 36 along the length of the pillar 36. The sheath 22 of the wire harness 20 is molded to fit securely between the pillar 36 and trim panel 44. Further, a plurality of apertures 52 which align with the connectors 46 and the trim panel 44 in the apertures 40 in the pillar 36 are formed through the sheath 22, at a safe distance from the wires 24.

During assembly, the wire harness 20 is placed against the first surface 38 of the pillar 36, aligning the apertures 52 in the sheath 22 with apertures 40 in the pillar 36. The connectors 46 in the trim panel 44 are then inserted through the apertures 52 in the sheath 22 of the wire harness 20, thereby insuring that the connectors 46 will not contact or damage the wires 24 in the wire harness 20. Then, the connectors 46 are snap fit into the apertures of the pillar 36, thereby retaining the trim panel 44 and the wire harness 20 to the pillar 36.

As can be seen in FIG. 3, when assembled, the trim panel 44 retains the wire harness 20 against the pillar 36. The sheath 22 of the wire harness 20 includes a first surface 56 having a contour generally complementary to that of the first surface 38 of the pillar 36. The sheath 22 of the wire harness 20 further includes an opposite surface 58 having a contour generally complementary to the abutting surface 60 of the trim panel 44. Further, the sheath 22 preferably substantially fills the cavity 50 formed between the trim panel 44 and the pillar 36. As can be seen in FIG. 3, the wires 24 are preferably spaced a safe distance from the apertures 52 through the sheath 22, through which the connectors 46 in the trim panel 44 pass. Further, the sheath 22 is disposed around and among the wires 24.

The wire harness 20 and pillar 36 of the present invention reduce the likelihood of damage to the wires 24 during assembly of the trim panel 44 to the pillar 36. Further, there are several features which reduce the potential for BSR (buzz, squeak, rattle). First, the surfaces 56, 58 of the sheath 22 are generally complementary to the surfaces 38, 60 of the pillar 36 and trim panel 44, respectively. Second, the sheath 22 substantially fills the cavity defined between the trim panel 44 and the pillar 36. Third, the connectors 46 on the trim panel 44 pass through the apertures 52 in the sheath 22, further retaining the sheath 22 in position and damping any relative movement among the connectors 46, trim panel 44 and pillar 36. Further, because the wires 24 are more dispersed and surrounded by the sheath 22, the trim panel 44 and pillar 36 will have improved head impact performance. The sheath 22 may alternatively comprise foam commonly used for head impact protection. The sheath 22 improves the head impact performance of the trim panel 44, reducing injury if the head of an occupant contacts the trim panel 44.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wire harness in a vehicle pillar comprising:

vehicle pillar having a first surface;

trim panel secured to said pillar adjacent said first surface, a cavity defined between said first surface and said trim panel;

wire harness routed through said cavity, said wire harness comprising a plurality of wires encased in a molded continuous sheath said wire harness being shaped to fill said cavity.

2. The wire harness of claim 1 wherein said sheath has a first contour which is generally complementary to a contour of said first surface.

3. The wire harness of claim 2 wherein said sheath has a second contour which is generally complementary to a contour of said trim panel.

4. The wire harness of claim 3 wherein said sheath is a molded polymer.

5. The wire harness of claim 4 wherein said sheath is a foam.

6. The wire harness of claim 5 wherein said sheath is molded around and among each of said plurality of wires.

7. The wire harness of claim 1 further including a connector connecting said trim panel to said pillar, said connector extending through an aperture in said sheath.

8. A wire harness for mounting in a vehicle pillar comprising:

a plurality of wires encased in a continuous polymer sheath disposed around and among said plurality of wires, said sheath having a first contour complementary to a first surface of a vehicle pillar and a second contour complementary to a second surface of a garnish trim panel whereby when the wire harness is installed in a cavity between the vehicle pillar and the garnish trim panel, the wire fills the cavity.

9. The wire harness of claim 8 wherein said sheath includes an aperture for receiving a trim panel connector.

10. The wire harness of claim 9 wherein said sheath is a foam.

11. The wire harness of claim 10 further including a first electrical connector mounted at a first end of said plurality of wires.

\* \* \* \* \*